United States Patent [19]
Connell, Jr. et al.

[11] Patent Number: 5,802,997
[45] Date of Patent: Sep. 8, 1998

[54] PLANTING APPARATUS AND RELATED METHOD

[75] Inventors: James W. Connell, Jr., Plainfield; Sarah E. Spencer, Lisle, both of Ill.

[73] Assignee: Case Corporation, Racine, Wis.

[21] Appl. No.: 772,928

[22] Filed: Dec. 24, 1996

[51] Int. Cl.⁶ ........................................ A01C 7/18
[52] U.S. Cl. .................. 111/170; 111/80; 111/200; 222/614
[58] Field of Search ................... 111/113, 17, 63, 111/64, 69, 73, 186–189, 80, 176, 903, 915, 921, 922, 200; 222/278, 129, 386, 614

[56] References Cited

U.S. PATENT DOCUMENTS

| | | |
|---|---|---|
| 169,072 | 10/1875 | Wright . |
| 474,256 | 5/1892 | Laude . |
| 488,356 | 12/1892 | Hasson . |
| 554,729 | 2/1896 | Reid . |
| 2,734,439 | 2/1956 | Padrick .................................. 111/80 X |
| 2,738,904 | 3/1956 | Poynor .................................... 222/386 |
| 3,394,667 | 7/1968 | White ..................................... 111/80 X |
| 3,683,829 | 8/1972 | Herrett ................................... 111/69 X |
| 4,122,974 | 10/1978 | Harbert et al. ....................... 111/922 X |
| 4,193,357 | 3/1980 | Freeman et al. ....................... 111/69 X |
| 4,264,023 | 4/1981 | Stocks et al. .......................... 111/69 X |
| 4,379,664 | 4/1983 | Klein et al. ............................ 111/80 X |
| 4,485,939 | 12/1984 | Gafford et al. .......................... 222/129 |
| 4,700,640 | 10/1987 | Andersson .................................. 111/1 |
| 5,598,794 | 2/1997 | Harms et al. ........................ 111/200 X |

*Primary Examiner*—Jack W. Lavinder
*Assistant Examiner*—Robert Pezzuto
*Attorney, Agent, or Firm*—Jansson, Shupe, Bridge & Munger, Ltd.

[57] ABSTRACT

A new mobile planting apparatus has first and second ranks of powered row units and first and second power devices connected respectively to and providing driving horsepower to such ranks. Suitable power devices include mechanical, electrical and hydraulic types with the latter being preferred. Each power device includes a control mechanism permitting the driving horsepower provided to the respective ranks to be independently controlled. That is, each power device may be independently operated or disabled and the power devices may run at different speeds and horsepowers. A new method for planting seeds enables a grower using two ranks of row units to plant seeds up to the boundary of a field while yet avoiding seeding beyond or short of the boundary with either row unit. The method also involves planting two different types of seeds.

17 Claims, 5 Drawing Sheets

PLANTING APPARATUS AND RELATED METHOD

FIELD OF THE INVENTION

This invention relates generally to planting and, more particularly, to planting row crops using a multiple-row seed dispensing and planting apparatus.

BACKGROUND OF THE INVENTION

Persons working in agriculture and, most notably, persons involved in designing agricultural machinery, have made enormous strides over the last century and even over the last decade. Productivity measured in terms of crop yield per acre tilled has increased markedly.

And the days of planting seeds by hand have disappeared for almost all but the home gardener. As evidenced by U.S. Pat. No. 169,072 (Wright), machines for automatically dropping seeds in a field date at least to 1875. And machines are now known for simultaneously spreading seed and fertilizer or seed and a herbicide. Note as examples the machines disclosed in U.S. Pat. No. 4,700,640 (Anderson) and U.S. Pat. No. 4,485,939 (Gafford et al.). Case Corporation, Racine, Wis., is a leading manufacturer of agricultural machines including planters.

Seed planters are implements towed by a tractor for planting seeds in a trough-like furrow. Such furrow is both opened and closed by the planter as it moves across the field. A seed planter has a pair of laterally-spaced wheels and a number of "row units" supported by such wheels and positioned along an axis generally perpendicular to the direction of travel. Each row unit receives seeds into a unit box from a common seed-holding compartment or, in some arrangements, from a small hopper associated with that particular row unit.

Each row unit has a separate rotating seed pickup device associated with it. As the device rotates, it accepts a few seeds fed from the from the common seed-holding compartment and drops such seeds into a seed cup which directs the seeds to a planting tube extending downwardly to a point just above the open furrow. The tube "aims" the seeds into the furrow which is then automatically closed by a pair of angled closure discs on the row unit and on the trailing side of the tube.

Significant to the invention described below is the fact that all of the seed pickup devices associated with a rank of row units are driven by a common shaft extending substantially the width of the planter. Many commonly-available planters have device drive shafts which are "ground driven." That is, they are connected by a chain drive to one of the wheels on the ground so that as such wheel turns, it turns the drive shaft. The drive shaft and pickup devices cannot be stopped unless the planter stops or unless the drive shaft is "de-clutched" by operating an electrical switch. And, of course, the speed of the planter across the field and the rotational speed of the drive shaft and the pickup devices are unalterably related to one another.

Planters are sometimes used in tandem and when so used, the row units of a particular planter are said to form a "rank." A tractor and two planters (i.e., two ranks of row units) are rigged so that the tractor tows both planters. When planters are used in tandem, they are usually coupled to the tractor in such a manner that the axis defined by row units on one planter leads or trails the axis defined by row units on the other planter.

And the planters are attached in such a way that the row units are staggered. That is, a respective row unit of the trailing planter is positioned midway between and somewhat behind a particular pair of row units of the leading planter. A motivation for this arrangement relates to good tillage practices involving close row spacing. Another motivation involves avoiding clogging row units with ground "trash," i.e., residue left from the previous year's crop.

For example, it is known that with soybeans, one obtains a good "canopy" of foliage over the earth if the rows of soybeans are planted not more than about 15 inches apart. A good canopy helps suppress weed growth and slows the rate of water evaporation. But the row units of a particular planter may be spaced apart by a dimension greater than 15 inches, e.g., by 20 inches. By using planters with exemplary 20 inch row unit spacing in tandem and mounting them as described above, the farmer is able to obtain 10 inch row spacing and this will result in a canopy which is desirably more dense.

But provision of a good canopy is not the only reason why one might want to plant rows more closely. The other (obvious) reason is that one is able to attain a higher crop yield from a particular land area.

Notwithstanding all of the foregoing, operating planters in tandem is not without disadvantages. It will be recalled that the row units (and, particularly, the seed pickup devices dropping seeds into feed cups) of a particular planter start, stop and change speed in concert with the towing tractor. And planting is usually done in a "raster" or back-and-forth zigzag pattern. When the tractor and the towed planters reach a boundary of a field, the tractor and planter must make a U-turn. With certain planters having two ranks of row units, i.e., leading and trailing ranks, the farmer may permit the leading rank to plant past the boundary (that is, until the rear rank reaches the boundary). Seed is deposited in the grassy or weedy area outside of the boundary and is wasted.

In the alternative, both ranks are disabled when the leading rank reaches the boundary. The result is that the land area covered by the trailing rank adjacent to the boundary is seeded at half density. In other words, the trailing rank does not plant up to the boundary—an increment of land is wasted for crop production.

Yet another feature of known planters involves seed-carrying capacity. Such capacity is (in view of aspects of the invention) somewhat limited. This affects productivity in that the farmer must stop planting when the seed compartment is empty, leave the field and refill the compartment.

Still another disadvantage of known planters is that they are not well configured to plant two different types of seeds, e.g., grain and grass seeds, simultaneously but at two different seeding rates. For example, simultaneous planting of alfalfa (a grass) and wheat (a grain) is now being practiced but requires the inclusion of an optional "add-on" attachment mounted at the machine front or rear.

Another disadvantage of known planters is that the bulk seed to be planted is not held at a depth to optimally fill the seed pickup devices associated with respective row units. Bulk seed behaves as a highly-viscous fluid and positioning such bulk seed directly over such devices and holding the seed at a substantial depth (at least when the seed compartments are initially filled) would be highly advantageous to "force feed" such devices.

A new planting apparatus and related method which address these shortcomings would be an important advance in the art.

OBJECTS OF THE INVENTION

It is an object of the invention to provide a new planting apparatus and method overcoming some of the problems and shortcomings of prior art planting apparatus.

Another object of the invention is to provide a new planting apparatus and method which help avoid wasting seed.

Another object of the invention is to provide a new planting apparatus and method which maximizes use of available land area for growing crops.

Yet another object of the invention is to provide a new planting apparatus and method facilitating independent control of each of two ranks of row units.

Another object of the invention is to provide a new planting apparatus which enhances seed-carrying capacity.

Still another object of the invention is to provide a new planting apparatus and method which permit simultaneous planting of grain and grass seed.

Another object of the invention is to provide a new planting apparatus which holds seeds at a substantial depth and vertically above or substantially vertically above seed pickup devices feeding row units. How these and other objects are accomplished will become apparent from the following descriptions and from the drawings.

SUMMARY OF THE INVENTION

The invention involves a mobile planting apparatus of the type having first and second ranks of powered row units. The new apparatus includes first and second power devices coupled to and providing driving horsepower to the first and second ranks, respectively. Each power device includes a control mechanism permitting the driving horsepower provided to the respective ranks to be independently controlled.

In a more specific aspect of the invention, the first and second power devices include first and second hydraulic drive motors and such first and second motors are connected to the first and second ranks, respectively. The first and second motors respectively power first and second seed dispensing mechanisms fixed with respect to the first and second ranks, respectively.

In the alternative, the first and second power devices include first and second electric drive motors and such first and second motors are coupled to the first and second ranks, respectively. The first and second motors power first and second seed dispensing mechanisms fixed with respect to the first and second ranks, respectively.

In yet another aspect of the invention, the new planting apparatus includes a first feed chamber coupled to the first rank and a second feed chamber coupled to the second rank. A hopper is above the ranks of row units and has a single fill opening in flow communication with both feed chambers. Such hopper includes a forward panel and a rear panel and each panel has a respective hopper extension member removably attached thereto, thereby increasing the capacity of the hopper. So configured, seeds can be carried at a substantially greater depth than was heretofore possible. And that is not all.

The apparatus also includes a divider between the feed chambers and, optionally, there is a divider extension member removably attached to the divider. Such extension member permits loading ample quantities of seeds into the respective chambers. And because seeds are held in substantially vertical "columns" above seed pickup devices, seed "feeding" to the feed cups is enhanced.

And the new planting apparatus need not be loaded with seeds of only a single type. In another aspect of the invention, the first feed chamber contains seeds of a first type and the second feed chamber contains seeds of a second type.

Yet another aspect of the invention involves a new method for planting seeds in a field having a field boundary. The method includes the steps of providing a mobile planting apparatus having leading and trailing ranks of row units powered by independently-controlled first and second power devices, respectively. As the boundary of a field is approached, the leading rank of row units is disabled when such leading rank is substantially in registry with the boundary. Thereafter, the trailing rank of row units is disabled when such trailing rank is substantially in registry with the boundary.

The apparatus includes a first feed chamber coupled to the first rank and a second feed chamber coupled to the second rank and the first disabling step is preceded by the step of placing seeds, e.g., the same type of seed, into both feed chambers. More specifically, the apparatus includes a hopper above the feed chambers. Such hopper has a single fill opening in flow communication with the feed chambers and the placing step includes depositing seeds through the fill opening.

More specifically, the hopper includes a forward panel and a rear panel and the first disabling step is preceded by the step of attaching a separate extension member to the forward panel and to the rear panel, respectively, thereby increasing the seed-carrying capacity of the hopper.

In an alternative aspect of the method, the first disabling step is preceded by the steps of flowing seeds of a first type to the leading rank of row units. Seeds of a second type are flowed to the trailing rank of row units and the apparatus user may thereby simultaneously plant seeds of two differing types.

It should be appreciated that given the inventive ability to dispense materials of disparate types, one is not limited to seed types. The invention contemplates that both fertilizer and seed could be dispensed simultaneously, one from each row unit. As used in this specification, the phrase "granular material" includes granular fertilizer and seeds.

And that is not all. Another aspect of the inventive method involves planting seeds or other granular material of differing types. The method includes the steps of providing a mobile planting apparatus having first and second ranks of row units driven by independently-controlled first and second motors, respectively. Such apparatus also has first and second feed chambers for flowing granular material, e.g., seeds, to the first and second ranks, respectively.

Granular material of a first type, e.g., fertilizer, is placed into the first feed chamber and granular material of another type, e.g., seeds, is placed into the second chamber. The first motor is operated at a first speed and the second motor is operated at a second speed, thereby dispensing the materials at differing rates. The granular material of the first type may be grain seeds and the granular material of the second type may be grass seeds. Where the material of the second type comprises grass seeds, the second speed is lower than the first speed.

Further details of the invention are set forth in the following detailed description and in the drawings.

DETAILED DESCRIPTION OF PREFERRED EMBODIMENTS

Figure 1:
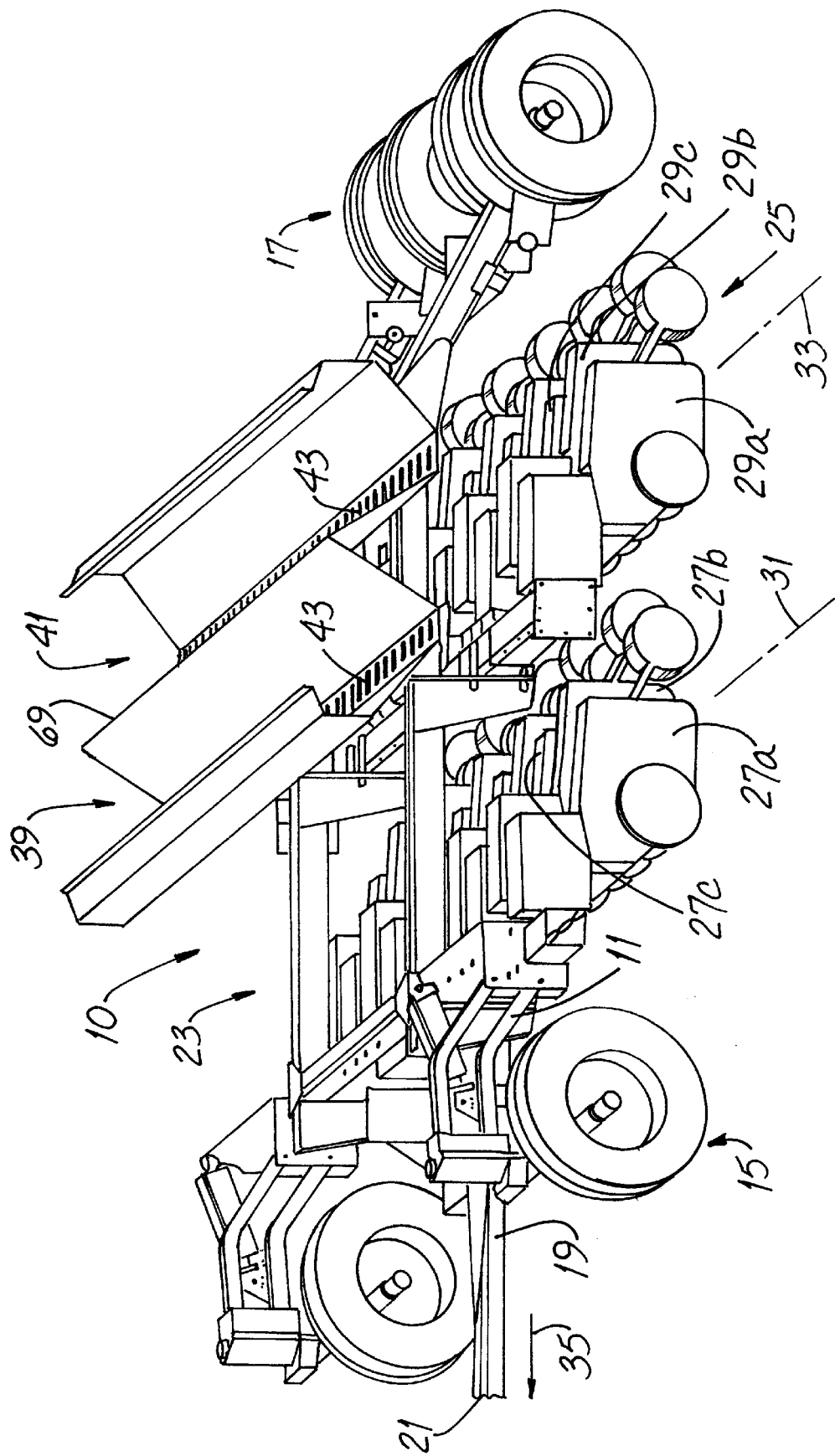
FIG. 1 is a representative perspective view of the new planting apparatus.
Figure 2:
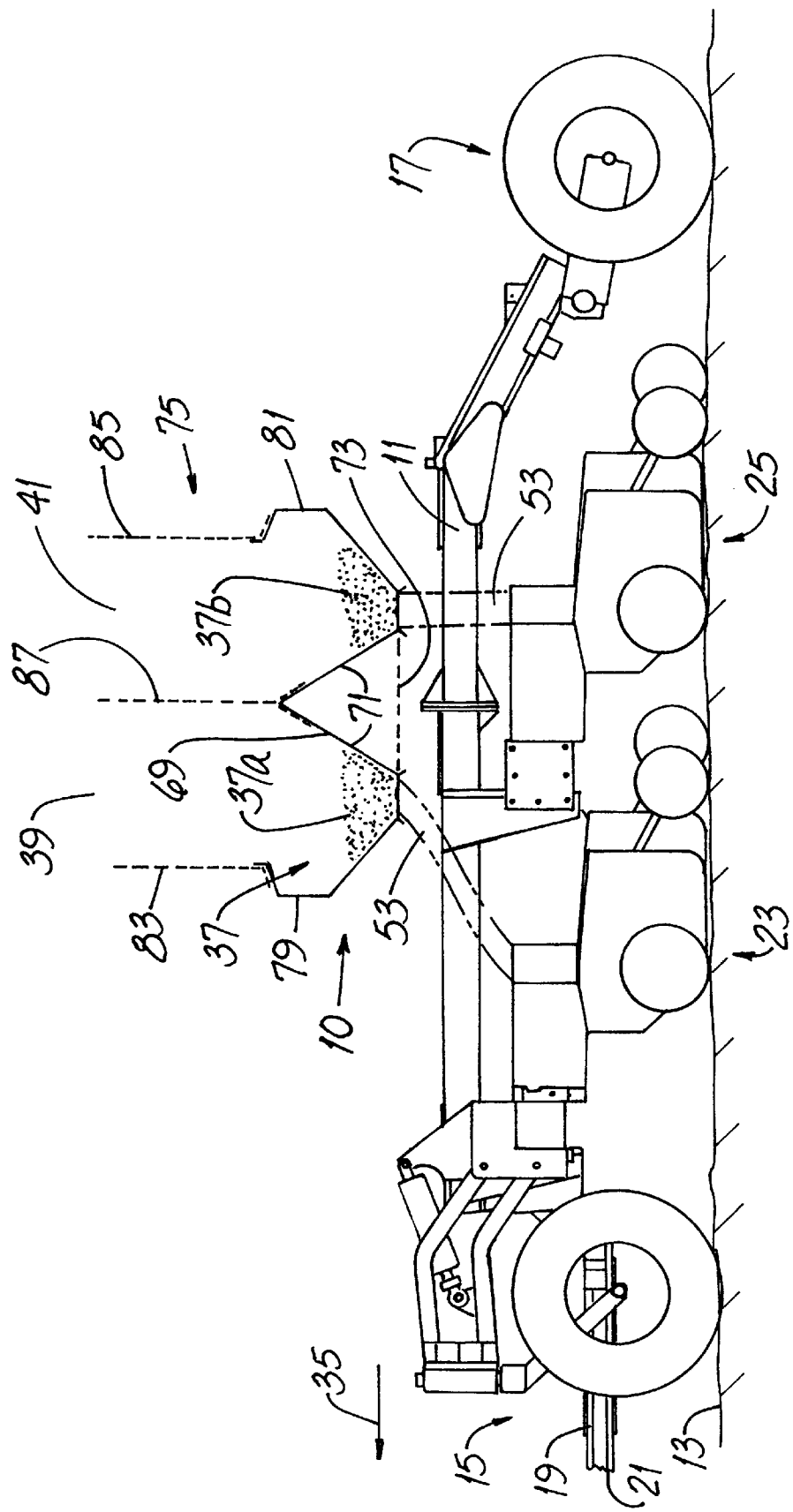
FIG. 2 is a representative side elevation view of the apparatus of FIG. 1.

Before describing details of the invention, it will be helpful to have an understanding of some of the basic principles of the new mobile planting apparatus 10 of a type often referred to as a "drill." Referring first to FIGS. 1 and 2, such apparatus 10 includes a frame 11 supported above the field 13 by front and rear sets of wheels 15 and 17, respectively. A tow bar 19 is coupled to the frame 11 and the distal end 21 of such bar 19 is attached to a tractor or other vehicle suitable for towing the apparatus 10 across the field 13.

The apparatus 10 has first and second ranks of row units, i.e., ranks 23 and 25, respectively. The first rank includes row units 27a, 27b, 27c and so forth, while the second rank includes row units 29a, 29b, 29c, and so forth. The ranks 23 and 25 extend laterally across the width of the apparatus and are aligned along respective axes 31 and 33 which are generally normal to the direction of apparatus travel as indicated by the arrow 35. As the name suggests and as further described below, each row unit 27, 29 deposits granular material, i.e., seeds or fertilizer, into a furrow. In the case of seed, each row unit 27, 29 plants a separate row of seed.

Figure 3:
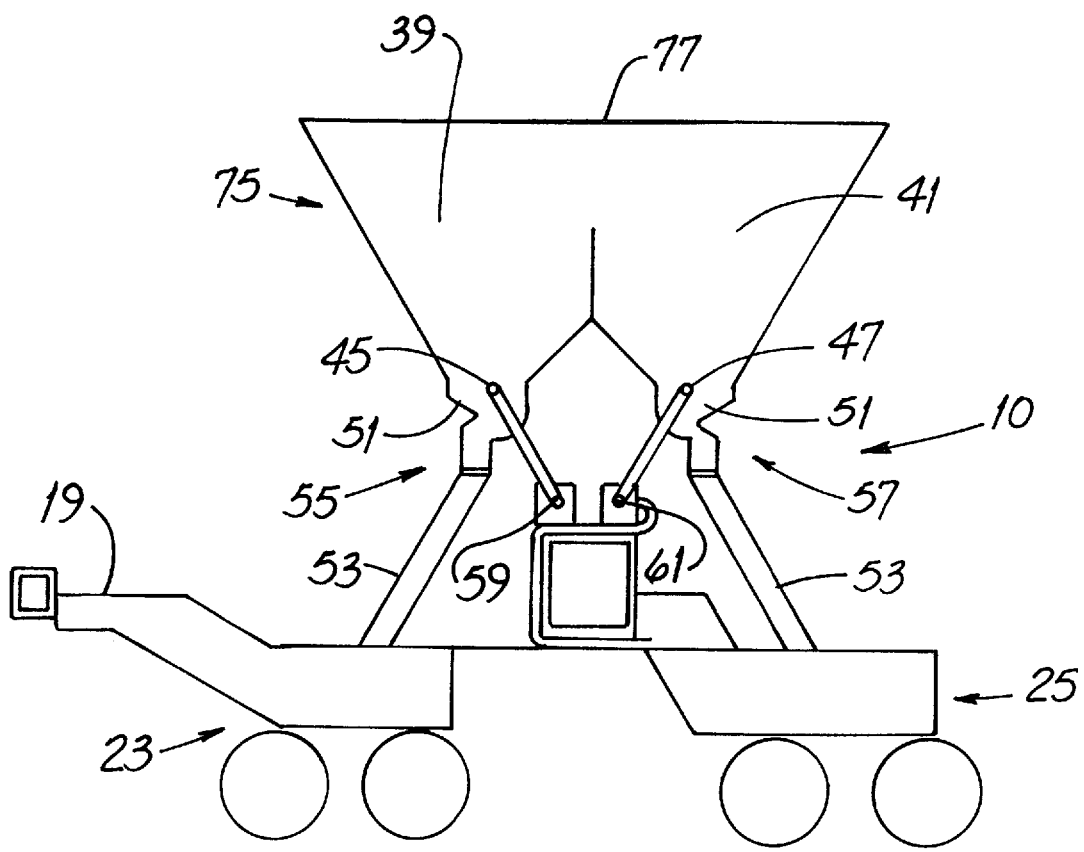
FIG. 3 is a representative side elevation view of the apparatus showing additional features thereof.

Referring also to FIG. 3, in one embodiment, the granular material 37 is carried in first and second feed chambers 39 and 41, respectively. By means described below, material 37 from the first feed chamber 39 is directed to the row units 27a, 27b, 27c comprising the first rank 23 while material 37 from the second feed chamber 41 is directed to the row units 29a, 29b, 29c comprising the second rank 25.

Figure 5:
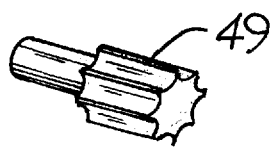
FIG. 5 is a perspective view of a seed pickup device.
Figure 4:
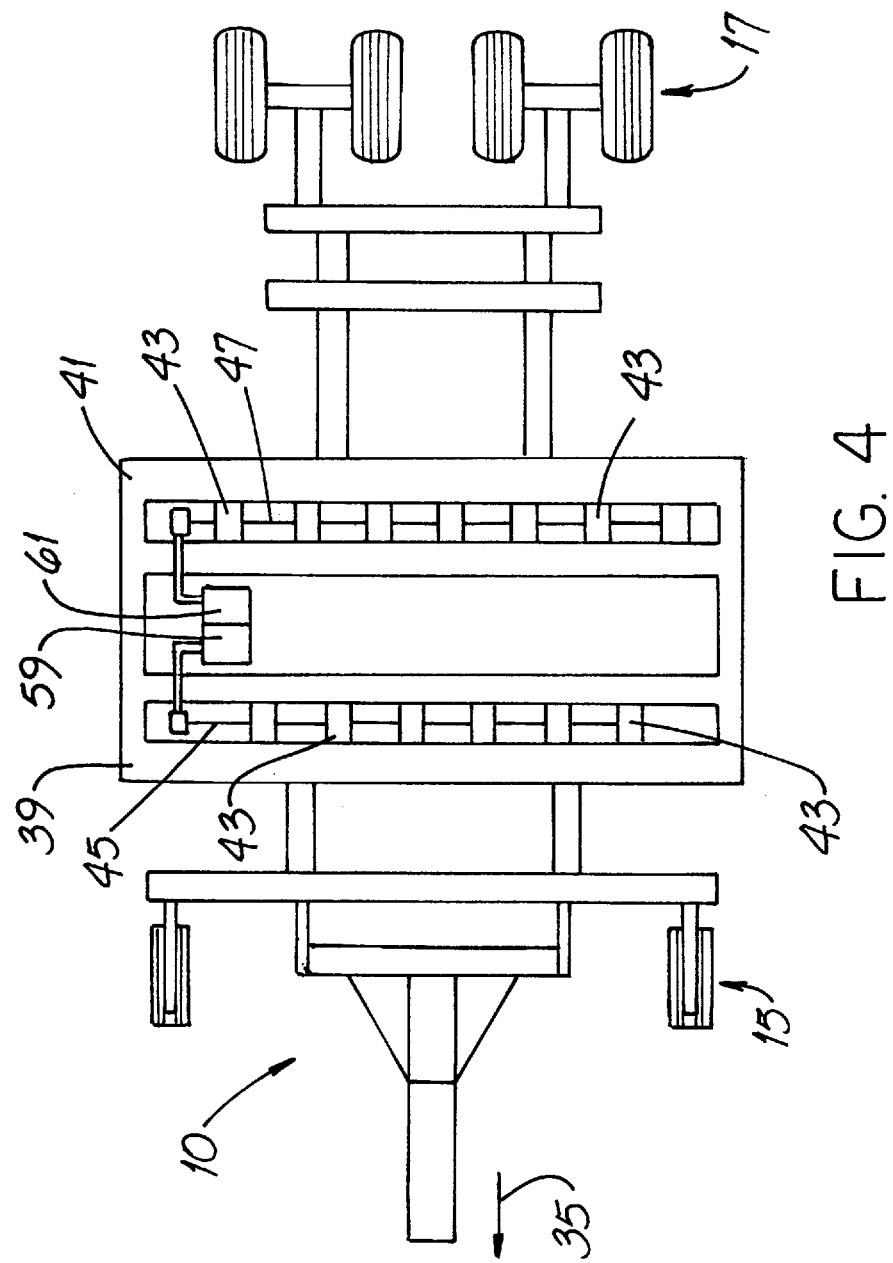
FIG. 4 is a top plan view of the new planting apparatus.

Referring particularly to FIGS. 1, 4, and 5, each feed chamber 39, 41 has a plurality of laterally-arranged and laterally-spaced openings 43 in the bottom thereof, each opening 43 generally being in registry with a row unit 27 or 29 such as units 27a, 27b, 27c. First and second laterally-extending powered shafts 45, 47 are mounted immediately below the openings 43 of the respective feed chamber 39, 41 extend substantially across the width of the respective chambers 39, 41 and rotatably drive seed pickup devices 49, e.g., a fluted roll, one such device 49 being below each opening 43. As the devices 49 rotate, each device 49 accepts a small quantity of granular material 37 (i.e., seed or fertilizer) and drops such quantity into a respective feed cup 51. Each such cup 51 directs the material 37 into a respective downwardly-extending tube 53. The shafts 45, 47, devices 49, cups 51 and tubes 53 form first and second dispensing mechanisms 55, 57 one for each row unit 27, 29, respectively.

Where the granular material 37 comprises seeds planted in a furrow, such tube 53 aims the seeds into the furrow. Where the material 37 comprises seeds planted on the soil surface or comprises fertilizer, the material 37 is deposited atop the field 13.

As particularly shown in FIGS. 3, 4, 6 and 7, the new apparatus 10 includes first and second power devices 59, 61, respectively, which are coupled to and provide driving horsepower for the first and second ranks 23, 25 respectively and, more particularly, to the first and second drive shafts 45, 47 associated with such ranks 23, 25 and rotating seed pickup devices 49. The power source 63 has two control mechanisms 65, 67 coupled thereto, thus permitting the driving horsepower provided by each power device 59, 61 to be independently controlled.

Figure 6:
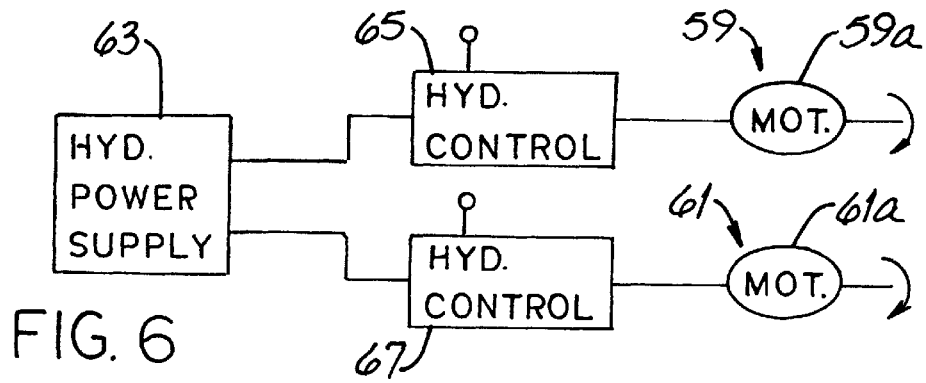
FIG. 6 is a block diagram of a dual-path hydraulic power train.
Figure 7:
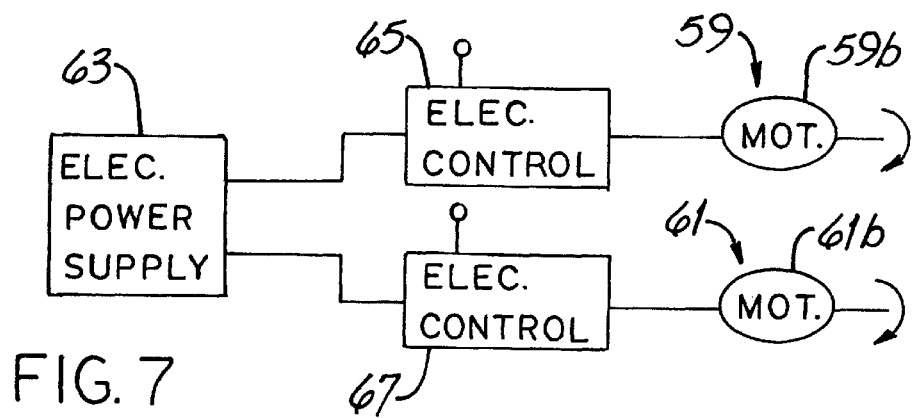
FIG. 7 is a block diagram of a dual-path electric power train.

As shown in FIG. 6, the first and second power devices 59, 61 are embodied as first and second hydraulic drive motors 59a and 61a, respectively. In the alternative shown in FIG. 7, the first and second power devices 59, 61 include first and second electric drive motors 59b, 61b.

Referring again to FIG. 2, the new planting apparatus 10 includes an inverted V divider 69 between the feed chambers 39 and 41. Such divider 69 has steeply-sloped sides 71 and while the divider 69 can be removed and replaced by a flat floor 73, the divider 69 is preferred as its sides 71 help urge seeds or other granular material 37 to positions more vertically above the openings 43 for optimum feeding.

Referring to FIG. 3, a hopper 75 is above the ranks 23, 25 of row units 27, 29 and has a single fill opening 77 in flow communication with both feed chambers 39, 41. As depicted in FIG. 2, such hopper 75 includes a forward panel 79 and a rear panel 81 and to increase the carrying capacity of the apparatus 10, each panel 79, 81 has a respective hopper extension member 83, 85 removably attached thereto. The arrangement of FIG. 3 providing the single fill opening 77 is used with both ranks 23, 25 of row units 27, 29 dispense the same granular material 37.

However, another embodiment of the apparatus 10 is configured in anticipation of dispensing different granular materials, e.g., seed and fertilizer or seeds of two different types, from each of the two feed chambers 39, 41 to respective ranks 23, 25 of row units 27, 29. The apparatus 10 includes an optional divider extension member 87 removably attached to the divider 69. As represented in FIG. 2, the first feed chamber 39 contains seeds 37a of a first type and the second feed chamber 41 contains seeds 37b of a second type.

Figure 8:
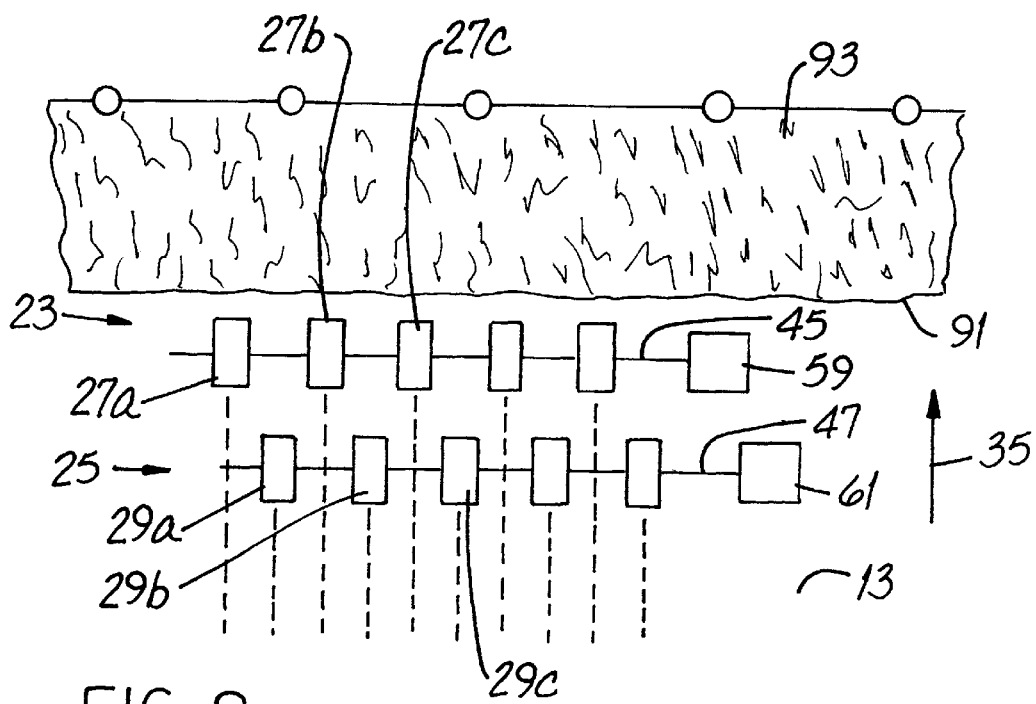
FIG. 8 is a plan view showing a field boundary and a representative depiction of the new apparatus.

Referring next to FIG. 8, yet another aspect of the invention involves a new method for planting seeds 37a and/or 37b in a field 13 having a field boundary 91. The method includes the steps of providing a mobile planting apparatus having leading and trailing ranks 23, 25, respectively, of row units 27a, 27b, 27c and 29a, 29b, 29c, respectively, the device drive shafts 45, 47 of which are powered by independently-controlled first and second power devices 59, 61, respectively. As the boundary 91 of a field 13 is approached, the leading rank 23 of row units 27 is disabled when such leading rank 23 is substantially in registry with the boundary 91 having an exemplary non-planted grassy area 93 beyond. Thereafter, the trailing rank 25 of row units 29 is disabled when such trailing rank 25 is substantially in registry with the boundary 91.

In a more specific aspect of the method, the first disabling step is preceded by the step of placing the same type of seed 37a or 37b into both feed chambers 39, 41 by either loading such chambers 39, 41 separately or by using a hopper 75 with a single fill opening 77 as shown in FIG. 3 and simply depositing seeds 37a or 37b through the fill opening 77. And for extra carrying capacity, the first disabling step is preceded by the step of attaching a separate extension member 83, 85 to the forward panel 79 and to the rear panel 81, respectively.

In an alternative aspect of the method, the first disabling step is preceded by the steps of flowing seeds 37a of a first type into the first chamber 39 to feed the leading rank 23 of row units 27. Seeds 37b of a second type are flowed to the second chamber 41 to feed the trailing rank 25 of row units 29 and the apparatus user may thereby simultaneously place seeds 37a, 37b of two differing types.

The first power device 59 is operated at a first speed and the second power device 61 is operated at a second speed, thereby dispensing the seeds 37a, 37b at differing rates. The seeds 37a of the first type may be grain seeds, e.g., wheat, soybeans, barley, rice, sorghum or millet, and the seeds 37b of the second type may be grass seeds, e.g., alfalfa, brome grass, Bermuda grass or any of the lawn grasses. Where the seeds 37b comprise grass seeds, the second speed is lower than the first speed. It is to be appreciated that notwithstanding the foregoing description, a user of the apparatus 10 may put grass seeds 37b into the first chamber 39 and may put grain seeds 37a into the second chamber 41. Or such user may put granular material comprising fertilizer in one of the chambers 39 or 41 and seeds 37 into the other chamber 41 or 39.

While the principals of the invention have been shown and described in connection with a few preferred embodiments, it is to be understood clearly that such embodiments are by way of example and are not limiting.

What is claimed:

1. A mobile planting apparatus having first and second ranks of powered row units and wherein:
   the apparatus includes first and second power devices connected to independently power first and second shafts and provide driving horsepower to the first and second ranks, respectively; and
   each power device includes a separate, independently-operable control mechanism permitting the driving horsepower provided to the respective ranks to be independently controlled and permitting each rank to be disabled independently of the other rank.

2. The apparatus of claim 1 wherein:
   the first and second power devices include first and second hydraulic drive motors, respectively; and
   the first and second hydraulic drive motors are connected to the first and second ranks, respectively.

3. The apparatus of claim 2 wherein:
   the first and second drive motors respectively power first and second seed dispensing mechanisms fixed with respect to the first and second ranks, respectively.

4. The apparatus of claim 1 wherein:
   the first and second power devices include first and second electric drive motors, respectively; and
   the first and second electric drive motors are coupled to the first and second ranks, respectively.

5. The apparatus of claim 4 wherein:
   the first and second drive motors respectively power first and second seed dispensing mechanisms fixed with respect to the first and second ranks, respectively.

6. The apparatus of claim 1 including:
   a laterally-disposed first feed chamber coupled to the first rank and a laterally-disposed second feed chamber coupled to the second rank.

7. The apparatus of claim 6 including a hopper above the ranks of row units, such hopper having a laterally-disposed single fill opening in flow communication with both feed chambers.

8. The apparatus of claim 7 wherein:
   the hopper includes a forward panel and a rear panel;
   the forward panel spans plural row units in the first rank of row units and the rear panel spans plural row units in the second rank of row units; and
   each panel has a respective hopper extension member removably attached thereto, thereby increasing the capacity of the hopper.

9. The apparatus of claim 8 including a divider between the feed chambers and having a divider extension member removably attached thereto for increasing the capacity of each feed chamber.

10. A method for planting seeds in a field having a field boundary, the method including:
    providing a mobile planting apparatus having leading and trailing ranks of row units powered by independently-controlled first and second power devices coupled to independently-powered first and second shafts, respectively;
    disabling the first shaft and the leading rank of row units when such leading rank is substantially in registry with the boundary; and
    disabling the second shaft and the trailing rank of row units when such trailing rank is substantially in registry with the boundary.

11. The method of claim 10 wherein the first disabling step is preceded by the steps of:
    flowing seeds of a first type to the leading rank of row units; and
    flowing seeds of a second type to the trailing rank of row units.

12. The method of claim 10 wherein the apparatus includes a laterally-disposed first feed chamber coupled to the first rank and a laterally-disposed second feed chamber coupled to the second rank and the first disabling step is preceded by the step of:
    placing seeds into the feed chambers.

13. The method of claim 12 wherein the apparatus includes a laterally-disposed hopper above the feed chambers and having a single fill opening in flow communication with such feed chambers and the placing step includes depositing seeds through the fill opening.

14. The method of claim 13 wherein the hopper includes a forward panel and a rear panel and the first disabling step is preceded by the step of:
    attaching a separate extension member to the forward panel and to the rear panel at positions above the first and second ranks, respectively, thereby increasing the seed-carrying capacity of the hopper.

15. A method for planting seeds of differing types, the method including:
    providing a mobile planting apparatus having first and second ranks of row units driven by independently-controlled first and second motors, respectively, such apparatus also having a first feed chamber for flowing seeds to plural row units in the first rank of row units and also having a second feed chamber for flowing seeds to plural row units in the second rank of row units;
    placing seeds of a first type into the first feed chamber;
    placing seeds of a second type into the second chamber;
    operating the first motor at a first speed; and
    operating the second motor at a second speed.

16. The method of claim 15 wherein the seeds of a second type are grass seeds and the second speed is lower than the first speed.

17. The method of claim 15 wherein the seeds of a first type are grain seeds and the seeds of a second type are grass seeds.

* * * * *